US011987142B2

(12) United States Patent
Yang

(10) Patent No.: US 11,987,142 B2
(45) Date of Patent: May 21, 2024

(54) TEMPERATURE REGULATION OF VEHICLE CHARGING COMPONENTS

(71) Applicant: TOYOTA MOTOR ENGINEERING & MANUFACTURING NORTH AMERICA, INC., Plano, TX (US)

(72) Inventor: Charlie Yang, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 404 days.

(21) Appl. No.: 17/214,044

(22) Filed: Mar. 26, 2021

(65) Prior Publication Data
US 2022/0305926 A1 Sep. 29, 2022

(51) Int. Cl.
*B60L 53/302* (2019.01)
*B60L 53/16* (2019.01)
*B60L 53/18* (2019.01)
*B60L 58/26* (2019.01)

(52) U.S. Cl.
CPC ............. *B60L 53/302* (2019.02); *B60L 53/16* (2019.02); *B60L 53/18* (2019.02); *B60L 58/26* (2019.02)

(58) Field of Classification Search
CPC ........ B60L 53/302; B60L 53/16; B60L 58/26; B60L 53/18
USPC ........................................................ 320/109
See application file for complete search history.

(56) References Cited

U.S. PATENT DOCUMENTS

| 3,601,679 | A  | * | 8/1971 | Braun | ............... | H02J 7/007194 |
| | | | | | | 320/DIG. 21 |
| 7,755,329 | B2 | | 7/2010 | Kohn et al. | | |
| 10,377,264 | B2 | * | 8/2019 | Lopez | ..................... | B60L 53/16 |
| 10,665,908 | B2 | | 5/2020 | Krull et al. | | |
| 10,800,276 | B2 | * | 10/2020 | Grienitz | ................... | H02G 3/03 |
| 2005/0285564 | A1 | * | 12/2005 | Mathews | ............... | B60W 20/00 |
| | | | | | | 320/116 |
| 2008/0203966 | A1 | * | 8/2008 | Ward | ........................ | H02J 7/35 |
| | | | | | | 903/907 |
| 2012/0038315 | A1 | * | 2/2012 | Wong | ..................... | H02J 7/0018 |
| | | | | | | 320/107 |
| 2012/0043943 | A1 | * | 2/2012 | Dyer | ........................ | B60L 58/26 |
| | | | | | | 320/160 |
| 2015/0217654 | A1 | * | 8/2015 | Woo | ......................... | B60L 53/16 |
| | | | | | | 320/109 |
| 2016/0090096 | A1 | | 3/2016 | Kauthen | | |
| 2016/0226110 | A1 | | 8/2016 | Jin et al. | | |
| 2017/0005383 | A1 | * | 1/2017 | Harris | ................. | H01M 50/227 |
| 2018/0086224 | A1 | * | 3/2018 | King | ..................... | H01M 10/63 |
| 2018/0178615 | A1 | | 6/2018 | Xia et al. | | |
| 2018/0304757 | A1 | | 10/2018 | Vaughan | | |
| 2019/0118661 | A1 | * | 4/2019 | Kim | ...................... | H01M 10/46 |

(Continued)

FOREIGN PATENT DOCUMENTS

CN 102290618 A 12/2011
CN 106887277 A * 6/2017
(Continued)

*Primary Examiner* — Suresh Memula
(74) *Attorney, Agent, or Firm* — Haynes and Boone, LLP

(57) ABSTRACT

Apparatuses and methods for temperature regulation of a charging system. A fluid is provided within a channel formed between a charging component of the charging system in a vehicle and a regulation jacket that surrounds the charging component. The charging component of the charging system is cooled via the fluid.

20 Claims, 10 Drawing Sheets

(56) References Cited

U.S. PATENT DOCUMENTS

| | | | |
|---|---|---|---|
| 2019/0214161 A1* | 7/2019 | Chen | B60L 50/64 |
| 2019/0221330 A1* | 7/2019 | Fuehrer | H01B 7/423 |
| 2019/0237218 A1* | 8/2019 | Heyne | H01B 9/006 |
| 2020/0035382 A1* | 1/2020 | Sato | B60L 53/18 |
| 2020/0076224 A1* | 3/2020 | Tsukamoto | H01M 10/613 |
| 2020/0234853 A1 | 7/2020 | Lee et al. | |
| 2020/0240869 A1* | 7/2020 | Yesh | G01M 3/38 |
| 2020/0343022 A1* | 10/2020 | Tasiopoulos | B60L 53/18 |
| 2020/0343601 A1* | 10/2020 | Carlson | B60L 58/26 |
| 2021/0267097 A1* | 8/2021 | Coppola | H05K 7/20872 |
| 2021/0370745 A1* | 12/2021 | Carlson | B60L 1/02 |
| 2022/0212554 A1* | 7/2022 | Gontarz | H01B 7/423 |
| 2022/0305882 A1* | 9/2022 | Yang | B60H 1/00278 |
| 2023/0046910 A1* | 2/2023 | Shidore | H01M 10/66 |

FOREIGN PATENT DOCUMENTS

| | | | | |
|---|---|---|---|---|
| CN | 109074916 A | * | 12/2018 | B60L 53/14 |
| CN | 115691891 A | * | 2/2023 | H01B 7/02 |
| CN | 115966341 A | * | 4/2023 | H01B 7/423 |
| CN | 116001522 A | * | 4/2023 | |
| DE | 102014200643 A1 | * | 7/2015 | B60L 11/18 |
| DE | 202017102368 U1 | * | 6/2017 | |
| DE | 102017120725 A1 | * | 3/2019 | B60L 53/18 |
| DE | 102018122680 B3 | * | 2/2020 | B60L 53/18 |
| DE | 102018123455 A1 | * | 3/2020 | |
| DE | 102018215875 A1 | * | 3/2020 | B60L 53/11 |
| DE | 102018125952 A1 | | 4/2020 | |
| DE | 102020104168 A1 | * | 8/2021 | |
| EP | 3588686 A1 | * | 1/2020 | B60L 53/00 |
| EP | 3812199 A1 | * | 4/2021 | B60L 53/16 |
| EP | 3882929 A1 | * | 9/2021 | B60L 53/16 |
| EP | 4125099 A1 | * | 2/2023 | H01B 7/423 |
| EP | 4125100 A1 | * | 2/2023 | B60L 53/18 |
| EP | 4147903 A1 | * | 3/2023 | B60L 53/18 |
| EP | 3766726 B1 | * | 4/2023 | B60L 53/11 |
| EP | 4159531 A1 | * | 4/2023 | H01B 7/423 |
| FR | 3102605 A1 | * | 4/2021 | B60L 53/16 |
| GB | 2606220 A | * | 11/2022 | F16H 57/0412 |
| JP | 2000133058 A | * | 5/2000 | |
| JP | 2008189249 A | | 8/2008 | |
| JP | 2016088103 A | | 5/2016 | |
| WO | WO-2017003510 A1 | * | 1/2017 | B60L 50/66 |
| WO | WO-2022202589 A1 | * | 9/2022 | |

* cited by examiner

800 ↘

802 — PROVIDE A FLUID WITHIN A CHANNEL FORMED BETWEEN A CHARGING COMPONENT OF THE CHARGING SYSTEM IN A VEHICLE AND A REGULATION JACKET THAT SURROUNDS THE CHARGING COMPONENT

804 — COOL, VIA THE FLUID, THE CHARGING COMPONENT OF THE CHARGING SYSTEM

902 — RECEIVE AN INDICATION THAT THE BATTERY SYSTEM WILL NEED TO BE HEATED UPON A NEXT STARTUP OF THE VEHICLE

904 — STORE A FLUID THAT HAS BEEN HEATED DURING OPERATION OF THE VEHICLE IN A STORAGE TANK

906 — CONTROL, AT THE NEXT STARTUP OF THE VEHICLE, A FLOW OF THE FLUID FROM THE STORAGE TANK TO THE BATTERY SYSTEM TO HEAT THE BATTERY SYSTEM

FIG. 9

TEMPERATURE REGULATION OF VEHICLE CHARGING COMPONENTS

CROSS-REFERENCE TO RELATED APPLICATIONS

The present application is related to U.S. patent application Ser. No. 17/214,069, entitled "Temperature Regulation for a Vehicle Power System," filed even date hereof, and which is incorporated by reference herein in its entirety.

FIELD

The present disclosure relates generally to electric vehicles, and more particularly, to systems and methods for regulation the temperature of a vehicle power system in an electric vehicle.

BACKGROUND

An electric vehicle, whether a fully electric vehicle or a hybrid electric vehicle, uses an electrical power system to power the vehicle. While a hybrid vehicle includes an engine system in addition to the electrical power system, a fully electric vehicle uses only the electrical power system. This electrical power system may take various forms. Generally, an electrical power system for a fully electric vehicle includes a battery system, a charging system, a power controller, and a thermal system. The battery system may include, for example, a high voltage (HV) battery pack, that stores power for use by an electric motor of the vehicle. The charging system is used to charge the battery system via an external power supply. The thermal system performs thermal regulation of various components of the electrical power system. Some currently available thermal systems may not provide the desired level of thermal regulation, may be unable to thermally regulate all components of the electrical power system, or may be unable to heat or cool various components of the electrical power system in various scenarios.

SUMMARY

In one embodiment, an apparatus is provided for temperature regulation. The apparatus comprises a charging component within a charging system of a vehicle and a regulation jacket. The charging system is coupled to a battery system of the vehicle. The regulation jacket surrounds the charging component and forms a channel between an inner surface of the regulation jacket and an outer surface of the charging component. The regulation jacket is configured to receive a fluid within the channel to cool the charging component.

In another embodiment, an electric vehicle is provided. The electric vehicle comprises a battery system, a charging system, and a set of regulation jackets. The charging system is coupled to the battery system. The charging system comprises a set of charging components. The set of regulation jackets is coupled to the set of charging components to form a channel around each charging component of the set of charging components. The channel around each charging component is configured to receive a fluid to cool the charging component.

In yet another embodiment, a method is provided for temperature regulation of a charging system. A fluid is provided within a channel formed between a charging component of the charging system in a vehicle and a regulation jacket that surrounds the charging component. The charging component of the charging system is cooled via the fluid. comprises.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals, letters, or both in the various examples. This repetition is for the purpose of simplicity and clarity and does not in itself dictate a relationship between the various embodiments and/or configurations discussed.

FIG. 8 is a flowchart of a method for temperature regulation of a charging system in accordance with one or more embodiments.

FIG. 9 is a flowchart of a method for temperature regulation within a vehicle in accordance with one or more embodiments.

DETAILED DESCRIPTION

Illustrative embodiments and related methods of the present disclosure are described below as they might be employed in one or more methods and systems for regulating the temperature of one or more components in the vehicle power system of an electric vehicle. In the interest of clarity, not all features of an actual implementation or method are described in this specification. It will of course be appreciated that in the development of any such actual embodiment, numerous implementation specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further aspects and advantages of the various embodiments and related methods of the disclosure will become apparent from consideration of the following description and drawings.

The example embodiments described below recognize that it may be desirable to have systems and methods system that can quickly and easy heat and/or cool various components of a vehicle power system in response to various conditions. The embodiments recognize and take into account that fluid circulating through a vehicle during operation of the vehicle may be passively heated. This heated fluid may be stored in a storage tank that is insulated and used at a future point in time (e.g., a future startup in cold weather) to heat the battery system, the drive unit, and/or one or more other components of the vehicle. Having this heated fluid on-demand may enable faster and simpler heating as compared to only using a heating device or passive heating to heat the components of the vehicle. Similarly, fluid circulating through a vehicle may be cooled in various situations. This cooled fluid may be stored in the storage tank for use at a future point in time. For example, the cooled fluid may provide on-demand cooling when the battery system has heated to undesirable temperatures during driving or charging of the battery system.

Further, fluid may be used within regulation jackets that are placed around various components of a charging system of a vehicle to improve cooling. For example, a regulation jacket having a channel for carrying a fluid (e.g., coolant) may be fit over a charging cable of a charging system. The fluid in the regulation jacket cools and/or helps maintain a desired temperature for the charging cable.

Figure 1:
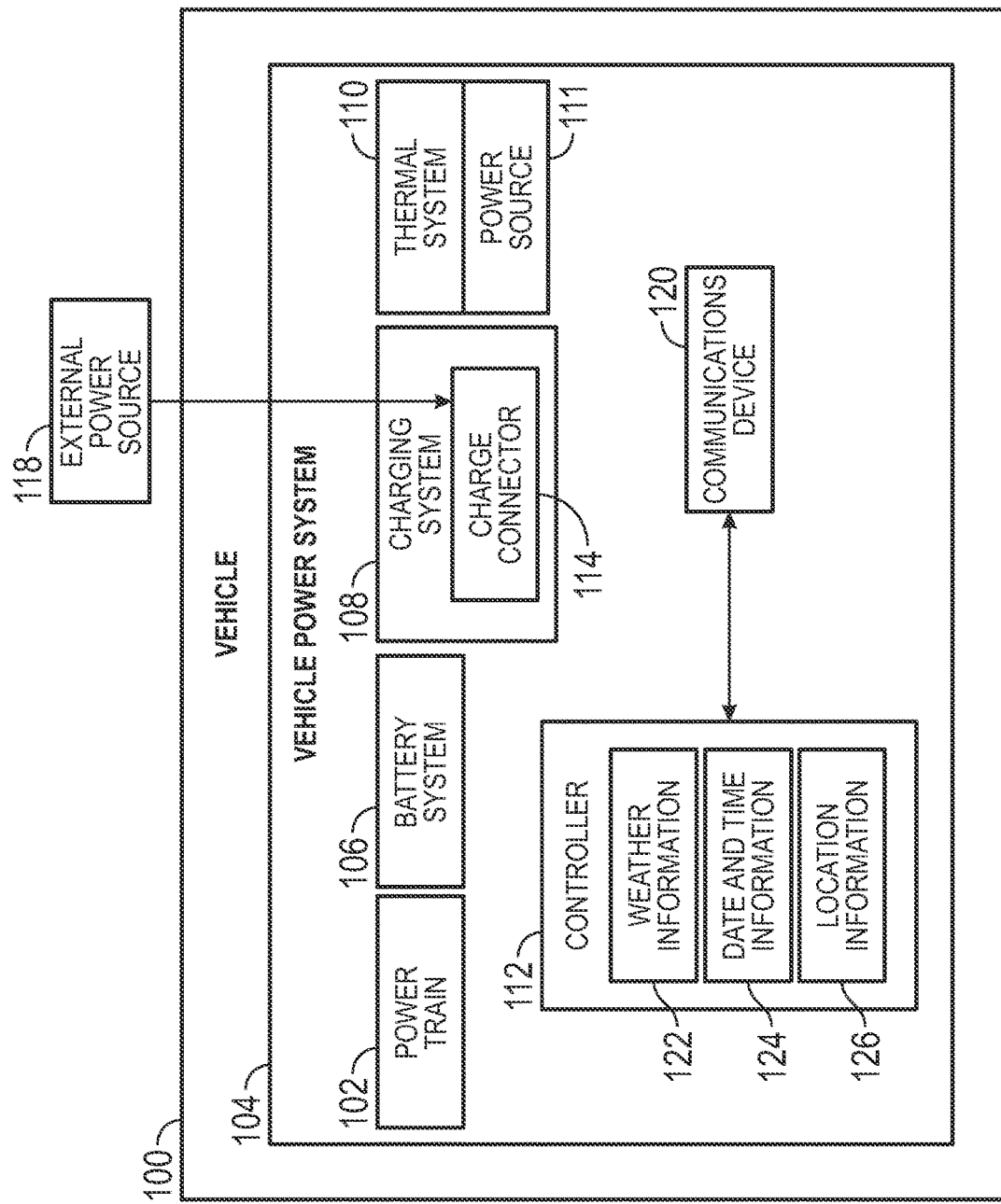
FIG. 1 is a schematic diagram of a vehicle in accordance with one or more embodiments.

Referring now to the figures, FIG. 1 is a schematic diagram of a vehicle 100 in accordance with one or more embodiments. Vehicle 100 is an electric vehicle. In one or more embodiments, vehicle 100 is a fully electric vehicle. Vehicle 100 includes powertrain 102 and vehicle power system 104. In one or more embodiments, vehicle power system 104 is a fully electric power system that is used to power powertrain 102. Powertrain 102 includes, for example, a drivetrain and an electric motor for vehicle 100. In one or more embodiments, powertrain 102 is considered part of vehicle power system 104.

Vehicle power system 104 includes various components including, but not limited to, battery system 106, charging system 108, thermal system 110, and controller 112. Battery system 106 includes one or more batteries. In one or more embodiments, battery system 106 includes a high voltage (HV) battery pack. Battery system 104 is used to provided power (e.g., via electric energy) to powertrain 102. For example, battery system 106 provides power to an electric motor of powertrain 102 of vehicle 100.

Charging system 108 is used to charge battery system 106. Charging system 108 may include various components such as, but not limited to, at least one of a charge connector, a set of cables, an onboard charger, or another component. Charge connector 114 may be used, for example, to plug external power source 118 into vehicle 100 to charge battery system 106.

Thermal system 110 is used to regulate the temperature of one or more components of vehicle power system 104, one or more components of powertrain 102, or both. Thermal system 110 may be used to heat and/or cool one or more components depending on the temperature of these one or more components. In one or more embodiments, thermal system 110 includes or is coupled to power source 111 in vehicle power system 104 that can supply power to thermal system 110 independently or separately from the rest of vehicle 100. For example, at least a portion of thermal system 110 may be capable of operating via this separate power source 111 even when vehicle 100 is turned off. In some embodiments, at least a portion of thermal system 110 is controlled by controller 112.

Controller 112 may be implemented using hardware, software, firmware, or a combination thereof. In one or more embodiments, controller 112 is comprised of multiple controllers or control units in communication with each other. In one or more embodiments, controller 112 controls operation of vehicle power system 104. Controller 112 may be used to, for example, without limitation, control at least one of powertrain 102, battery system 106, charging system 108, or thermal system 110. In some embodiments, controller 112 is part of or in communication with another control unit of vehicle 100 that controls other systems, such as components outside of vehicle power system 104. In other embodiments, controller 112 may control other components outside of vehicle power system 104.

In some embodiments, controller 112 uses communications device 120 to communicate with one or more onboard devices, one or more offboard devices, or a combination thereof. For example, communications device 120 may enable data to be sent to and/or received from a remote device. In some examples, communications device 120 allows controller 112 to communicate wirelessly with a server, a mobile device, a laptop, a weather station, an application on a mobile device, the Internet, or some other source of information.

Controller 112 may, for example, receive weather information 122, date and time information 124, and/or location information 126 through communications device 120. Weather information 122 may be received from a weather service, for example. Date and time information 124 and/or location information 126 may be received from a global positioning system (GPS), for example.

Controller 112 can use that weather information 122, date and time information 124, and/or location information 126 to control operation of thermal system 110. As one example, in response to receiving weather information 122 indicating that outside temperatures will be below freezing on a particular date and time and date and time information 124 indicating a current date and time, controller 112 may initiate or schedule one or more actions that will improve temperature regulation upon vehicle startup, during driving, or both with respect to the particular date and time. Similarly, in response to receiving weather information 122 or other information that indicates there will a significant demand on battery system 106 that will likely cause battery system 106 to heat, controller 112 may initiate or schedule one or more actions that will improve temperature regulation when driving in such conditions.

Figure 2:
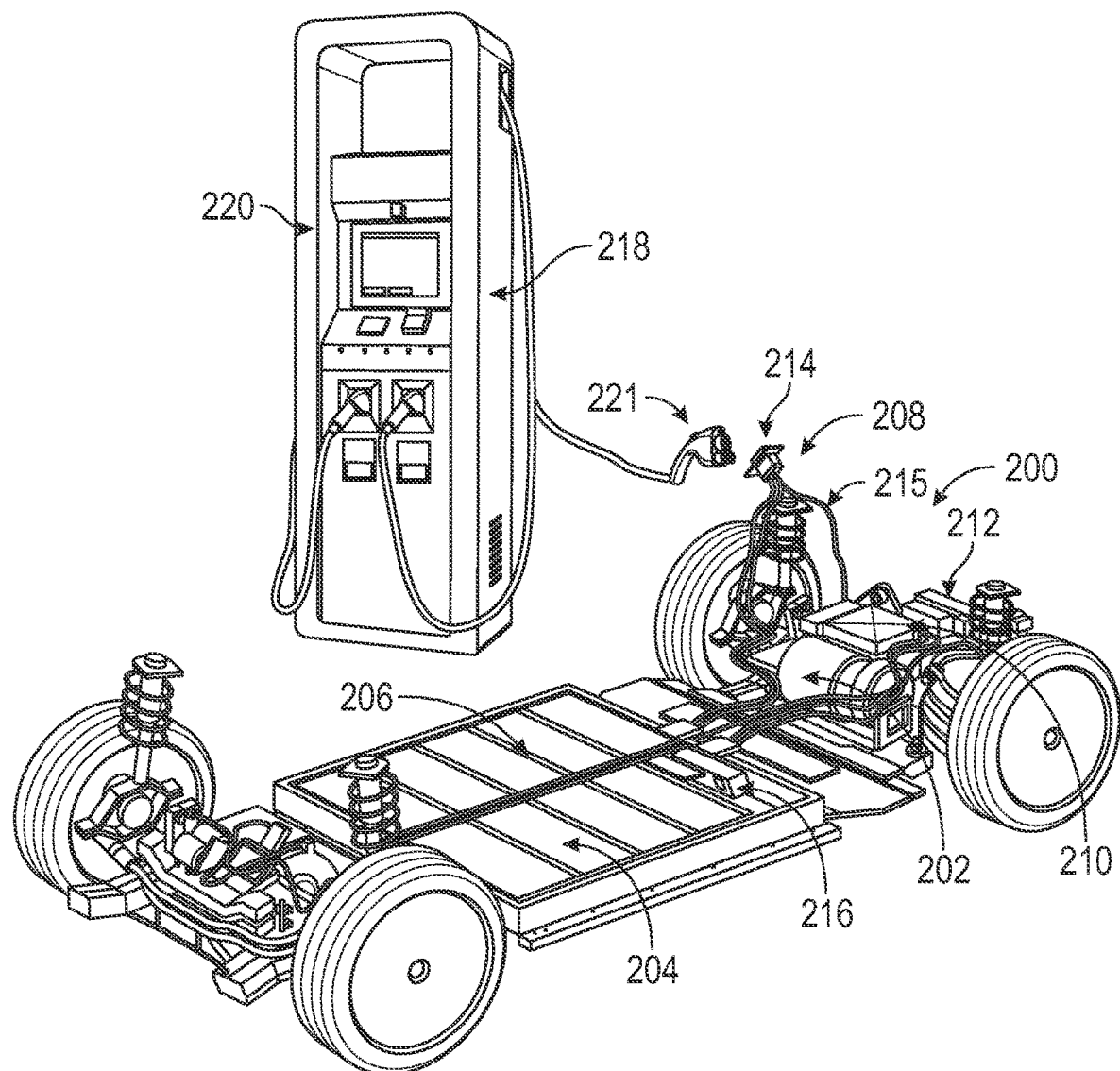
FIG. 2 is a schematic diagram of a vehicle in accordance with one or more embodiments.

FIG. 2 is a schematic diagram of a vehicle 200 in accordance with one or more embodiments. Vehicle 200 is one example of an implementation for vehicle 100 in FIG. 1. Vehicle 200 is an electric vehicle. In one or more embodiments, vehicle 200 is a fully electric vehicle. The various components described in vehicle 200 may be used in conjunction with one or more other components of vehicle 100 in FIG. 1.

Vehicle 200 includes powertrain 202 and vehicle power system 204, which are examples of implementations for powertrain 102 and vehicle power system 104, respectively, in FIG. 1. In one or more embodiments, vehicle power system 204 is a fully electric power system that is used to power powertrain 202. Powertrain 202 includes, for example, a drivetrain and an electric motor for vehicle 200. In one or more embodiments, powertrain 202 or at least a portion of powertrain 202 is considered part of vehicle power system 204.

Vehicle power system 204 includes various components including, but not limited to, battery system 206, charging system 208, thermal system 210, and controller 212, which are examples of implementations for battery system 106, charging system 108, thermal system 110, and controller 112, respectively, in FIG. 1. Battery system 206 includes one or more batteries. In one or more embodiments, battery system 206 includes a high voltage (HV) battery pack. Battery system 204 is used to provided power (e.g., via electric energy) to powertrain 202. For example, battery system 206 provides power to an electric motor of powertrain 202 of vehicle 200.

Charging system 208 is used to charge battery system 206. Charging system 208 may include various components such as, but not limited to, at least one of charge connector 214, set of cables 215, onboard charger 216, or another component. Charge connector 214 is used to plug external power source 218 into vehicle 200 to charge battery system 206. External power source 218 may take various forms. In one or more embodiments, external power source 218 includes charging station 220 and plug 221. Plug 221 connects charging station 220 to charge connector 214 of vehicle 200. In some embodiments, external power source 218 includes charging station 220 and a separate power supply to which charging station 220 is connected.

Set of cables 215 may be used to conduct electricity between the various components of charging system 208. One or more cables of set of cables 215 may, for example, connect charge connector 214 to battery system 206. One or more cables of set of cables 215 may connect charge connector 214 to onboard charger 216, with one or more cables connecting onboard charger 216 to battery system 206.

When charging system 208 is connected to a power supply, such as external power source 218, an outlet in a home, a portable charger, or another charger that provides electricity in the form of alternating current (AC), onboard charger 214 is used to convert the AC into direct current (DC). Onboard charger 214 may not be needed when charging system 206 is connected to external power source 218 in the form of a system that provides electricity in DC.

Thermal system 210 is used to regulate the temperature of one or more components of vehicle power system 204. Thermal system 210 may be used to heat and/or cool one or more components depending on the temperature of these one or more components. Thermal system 210 includes set of devices 222 that is used to regulate temperature. Set of devices 222 may include, for example, but is not limited to, at least one of a regulation jacket, a storage tank, a plurality of lines, a sensor system, a valve system, a reservoir, a radiator, or another type of device.

Controller 212 controls operation of vehicle power system 204. Controller 212, which may alternatively be referred to as a control unit, may be used to, for example, without limitation, control at least one of powertrain 202, battery system 206, charging system 208, or thermal system 210. In some embodiments, controller 212 is part of or in communication with another control unit of vehicle 200 that controls other systems, such as components outside of vehicle power system 204. In other embodiments, controller 212 may control other components outside of vehicle power system 204. In one or more embodiments, controller 212 is comprised of multiple controllers or control units in communication with each other. Controller 212 may be implemented using hardware, software, firmware, or a combination thereof.

Figure 3:
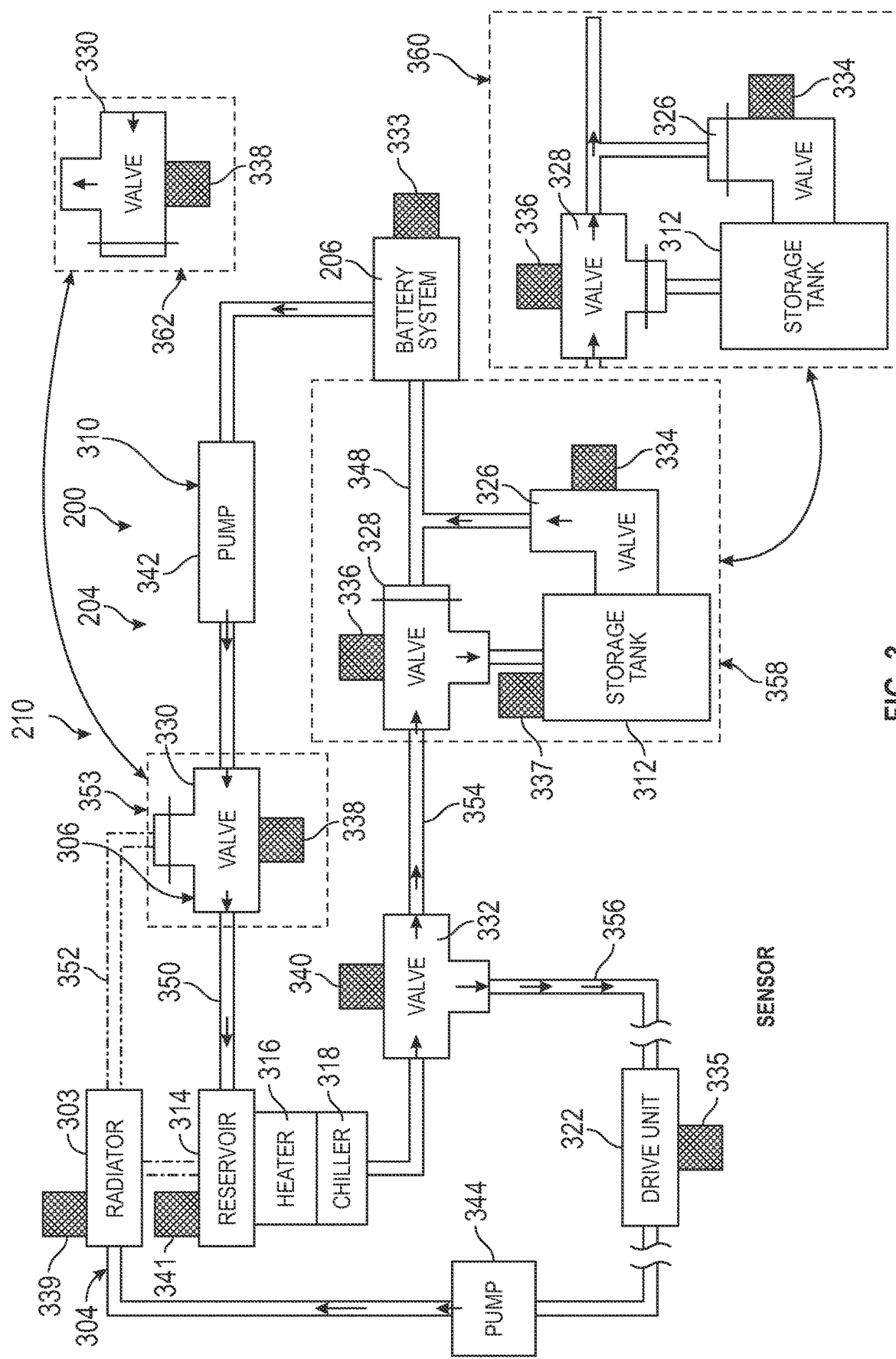
FIG. 3 is a schematic diagram of the thermal system of the vehicle power system within the vehicle from FIG. 2 in accordance with one or more embodiments.

FIG. 3 is a schematic diagram of thermal system 210 of vehicle power system 204 within vehicle 200 in accordance with one or more embodiments. The various components described in vehicle 200 may be used in conjunction with one or more other components of vehicle 100 in FIG. 1.

Vehicle power system 204 includes thermal system 210. Thermal system 210 is one example of an implementation for thermal system 110 in FIG. 1. Thermal system 210 includes radiator 303, a plurality of lines 304, valve system 306, sensor system 308, pump system 310, storage tank 312, reservoir 314, heater 316, and chiller 318. Thermal system 210 is used to regulate the temperature of one or more components of vehicle power system 204, such as, for example, but not limited to, battery system 206, and one or more other components of vehicle 200, such as, for example, but not limited to, drive unit 322. Drive unit 322 is one example of a component of powertrain 202 in FIG. 2.

Radiator 303 is a heat exchanger. In one or more embodiments, fluid 324 is circulated through radiator 303 where heat in fluid 324 can be transferred to the atmosphere. Fluid 324 may then be sent back out into vehicle power system 204. Fluid 324 is used to regulate the temperature of one or more components within vehicle power system 204. In one or more embodiments, fluid 210 takes the form of a coolant. For example, fluid 210 may include water, ethylene glycol, propylene glycol, a perfluoropolyether (PFPE), another type of coolant, a thermal fluid, or a combination thereof.

Lines 304 include various lines that couple the various components of vehicle power system 204. Lines 304 carry fluid 324. Lines 304 may have channels that enable fluid 324 to be circulated to and around and/or through these various components.

Valve system 306 helps control the flow of fluid within lines 304 to the various components of vehicle power system 204. In one or more embodiments, valve system 306 includes one or more on/off valves, one or more diverter valves, one or more control valves, one or more other types of valves, or a combination thereof. An on/off valve is a device that either allows unimpeded flow or acts to prevent flow altogether. An on/off valve may take various forms, including, but not limited to, a ball valve, a butterfly valve, a gate valve, a diaphragm valve, or another type of shutoff valve. A diverter valve is a device that enables switching the flow from one direction (e.g., into a first line) to another direction (e.g., into a second line). A control valve is a device that is used to control a flow of fluid.

In one or more embodiments, valve system 306 includes valve 326, valve 328, valve 330, and valve 332. In some examples, valve 326 is an on/off valve. In some examples, valve 328, valve 330, and valve 332 are diverter valves.

Sensor system 308 includes a set of sensors that monitor the temperature of fluid 324 at various locations within vehicle power system 204. In one or more embodiments, sensor system 308 includes one or more sensors that monitor the temperature of fluid 324 at various locations within thermal system 204. In some embodiments, sensor system 308 includes one or more sensors that monitor the temperature of fluid 324 of various components within vehicle power system 204. One or more of the sensors within sensor system 308 may take the form of thermocouples. In one or more embodiments, sensor system 308 includes at least sensor 334, sensor 336, sensor 338, and sensor 340 that monitor the temperature of fluid 324 at valve 328, valve 330, and valve 332, respectively.

Further, sensor system 308 may include sensor 333, sensor 335, sensor 337, sensor 339, and sensor 341 that monitor the temperatures of battery system 206, drive unit 322, storage tank 312, radiator 303, and reservoir 314, respectively. The various sensors may be attached to, coupled to, connected to, integrated as part of, or otherwise associated with the various components for which temperatures are being monitored. In one or more embodiments, sensor 337 is positioned at or coupled to an entrance into storage tank 312 in order to monitor the temperature of fluid 324 entering storage tank 312. In other embodiments, recognizing that the temperature of storage tank 312 may closely match (e.g., within a few degrees, within one degree, etc.) the temperature of fluid 324 within storage tank 312, sensor 337 may be coupled to a surface of storage tank 312 to monitor the temperature of storage tank 312.

Pump system 310 is used to pump fluid 324 through one or more of lines 324. In one or more embodiments, pump system 310 includes pump 342 and pump 344. Storage tank 312 is used to house fluid 324 in various selected conditions. Storage tank 312 is insulated. In one or more embodiments, storage tank 312 is sufficiently insulated to maintain a temperature of fluid 324 in storage tank 312 for at least a selected number of hours (e.g., 4 hours, 6 hours, 8 hours, 10 hours, 12 hours, 24 hours, 2 days, 3-5 days, one week, etc.). Storage tank 312 may be always filled with fluid 324 such that any new fluid 324 that enters storage tank 312 through valve 336 causes old fluid 324 within storage tank 312 to be moved out through valve 326. Reservoir 314 is used to hold fluid 324 received from radiator 303 to enable heating or cooling of fluid 324 as needed. For example, heater 316 may be used to heat fluid 324 within reservoir 314. Chiller 318 may be used to cool fluid 324 within reservoir 314.

Thermal system 210 can be used to regulate temperatures of the components of vehicle 200 in various ways. For example, thermal system 210 may use fluid 324 to heat and/or cool the various components of vehicle 200. In one or more embodiments, one or more components may be cold at startup of vehicle 200. For example, battery system 206 and/or drive unit 322 may be at temperatures low enough to affect performance of battery system 206 and/or drive unit 322, respectively. For example, without limitation, the performance of battery system 206 may be affected in an undesired manner when battery system 206 is at a temperature at or below about 20 degrees Celsius, at or below about 10 degrees Celsius, at or below about 0 degrees Celsius, etc. Thermal system 210 provides temperature regulation to help heat these one or more components to ensure a desired performance of the one or more components (e.g., battery system 206 and/or drive unit 322).

In some embodiments, in anticipation of a cold startup, storage tank 312 is used to store fluid 324 that has been heated during operation of vehicle 200 for future use. For example, during driving, fluid 324 is heated and sensor system 308 is used to detect one or more conditions that determine when fluid 324 is to be stored. In some embodiments, sensor system 308 receives an indication that battery system 206 and/or drive unit 322 system will need to be heated upon a next startup of the vehicle. This indication may be, for example, based on weather information 122, date and time information 124, location information 126, information from one or more other sensors in sensor system 308, or a combination thereof. In some examples, sensor system 308 includes an ambient sensor that measures a temperature of the ambient environment around vehicle 200. Sensor system 308 may recognize the ambient temperature being below some threshold value (e.g., 10 degrees Celsius, 5 degrees Celsius, 0 degrees Celsius, −5 degrees Celsius, etc.) as the indication that storage tank 312 should be filled with fluid 324 that is hot.

For example, without limitation, sensor system 308 may be used to detect when the temperature of fluid 324 meets a threshold storage temperature. In this example, once sensor detects that fluid 324 has reached this threshold storage temperature, valve 328 opens to storage tank 312 and closes to line 348. Further, if open, valve 326 closes. Line 348 may directly or indirectly (e.g., via one or more other lines) carry fluid 324 received through valve 326 to battery system 206. Thus, when valve 326 is closed to line 348, fluid 324 does not flow to battery system 206. Valve 328 diverting fluid 324 into storage tank 312 with valve 326 turned off enables storage tank 312 to fill with fluid 324 that is hot.

Fluid 324 that is sufficiently hot may be, for example, fluid 324 that is at or above a desired operating temperature for battery system 206 and/or drive unit 322. In one or more embodiments, this desired operating temperature is about 30 degrees Celsius (e.g., within 2 degrees of 30 degrees Celsius, within 5 degrees of 30 degrees Celsius, etc.). Thus, in such examples, fluid 324 may be considered "hot" when fluid 324 has, for example, a temperature that is at or above 30 degrees Celsius.

In some embodiments, sensor system 308 monitors temperature differentials between various pairs of the sensors in sensor system 308 to determine whether to store fluid 324 that has been heated. A temperature differential between two sensors is the difference in temperature (e.g., may be in absolute value) between two sensors). In one or more embodiments, sensor system 308 monitors for a first storage condition by monitoring a first temperature differential between sensor 333 monitoring battery system 206 and sensor 337 monitoring storage tank 312 (or fluid 324 within storage tank 312), a second temperature differential between sensor 335 monitoring drive unit 322 and sensor 337, or both. When the first temperature differential, the second temperature differential, or both indicate that the temperature of battery system 206, drive unit 312, or both, respectively, are higher than storage tank 312 (or fluid 324 within storage tank 312) by some selected amount (e.g., 1 degree Celsius, 2 degrees Celsius, 3 degrees Celsius, 4 degrees Celsius, 5 degrees Celsius, 7 degrees Celsius, 10 degrees Celsius, etc.), valve 328 may open to storage tank 312 and close to line 348. This enables fluid 324 that is hot to flow into and fill storage tank 312.

In one or more embodiments, valve 326 remains open to allow any fluid 324 that is cold within storage tank 312 to be pushed out of storage tank 312 as fluid 324 that is hot moves into storage tank 312. When valve 328 is open to storage tank 312 and closed to line 348 and when valve 326 is open, valve 328 and valve 326 may be considered as operating in a first stage 358 of operation of thermal system 210. Valve 326 may close when sensor 334 no longer detects fluid 324 that is cold or, in other words, detects fluid 324 that is hot, as described above. Thus, valve 326 allows fluid 324 that is hot to remain in storage tank 312. Fluid 324 that is considered "cold" may be fluid with a temperature that is below the desired operating temperature for battery system 206 and/or drive unit 322. In some examples, sensor system 308 monitors a temperature differential between sensor 336 and sensor 334 or between sensor 337 and sensor 334. When there is zero or substantially zero (e.g., within 1 or 2 degrees of zero) temperature difference between either of these pairs of sensors, valve 326 may close. Valve 326 may also close is sensor 334 detects a higher temperature than the temperature detected by sensor 336.

Storage of fluid 324 within storage tank 312 may continue until, for example, sensor 337 detects that storage tank 312 or fluid 324 within storage tank 312 is sufficiently hot, sensor 336 detects fluid 324 that is cold, or both. Once storage tank 312 has been filled with fluid 324 that is hot, valve 328 may close to storage tank 312 and open to battery system 206. When valve 328 is closed to storage tank 312 and open to battery system 206 and valve 326 is closed, valve 328 and valve 326 may be considered as operating in a second stage 360 of operation of thermal system 210.

In some embodiments, this second stage 360 of operation is initiated in response to sensor 336 and sensor 334 detecting a non-zero temperature differential or a temperature differential of at least some number of degrees (e.g., a temperature difference of at least 0.5 degrees Celsius, at least 1 degree Celsius, at least 2 degrees Celsius, at least 5 degrees Celsius, at least 7 degrees Celsius, etc.) between the temperatures detected by sensor 336 and sensor 334. Once this such a temperature differential is detected, second stage 360 may be initiated as described above.

In some embodiments, the detection of temperatures that determine whether to store fluid 324 in storage tank 312, the storage of heated fluid 314 within storage tank 312, or both occurs while vehicle 200 is turned off. When vehicle 200 is turned off, pump 340 and pump 342 can activate to circulate any remaining hot fluid 324 to storage tank 312.

Fluid 324 within storage tank 312 is maintained at the substantially hot temperature due to the insulation within storage tank 312. This hot fluid 324 may be stored for use at a next startup of vehicle 200. Storage tank 312 maintains the temperature of fluid 324 within selected tolerances (e.g., within 1 degree, within 2 degrees, 4 degrees, 5 degrees, etc.) while vehicle 200 is turned off.

In some embodiments, fluid 324 may not reach the threshold storage temperature or be as hot as desired prior to vehicle 200 being turned off. In such cases, heater 316 may be used to heat fluid 324 for storage in storage tank 312. In some embodiments, heater 316 may be controlled by, for example, a controller (e.g., controller 112 in FIG. 1) to heat fluid 324 in response to weather information. In some embodiments, heater 316 is used to heat fluid 324 during charging of battery system 206.

When vehicle 200 is turned on with a cold startup, valve 326 may be turned on and hot fluid 324 within storage tank 312 may be released into, for example, line 348 to thereby heat battery system 206 and drive unit 322. This heating may improve the performance of battery system 206 and drive unit 322 at startup and a period of time after startup. As one example, fluid 324 travels through line 348 to battery system 206, heats battery system 206, and is carried to pump 342, which circulates fluid 324 through valve 330. Valve 330 is open to line 350 and closed to line 352 to thereby allow fluid 324 to flow towards reservoir 314 while preventing fluid 324 from flowing towards radiator 303. Preventing fluid 324 from flowing towards radiator 303 prevents fluid 324 from being cooled by radiator 303. This ensures fluid 324 circulating through thermal system 210 can heat battery system 206 and/or drive unit 335 as needed. Valve 330 being closed to line 352 and open to line 350 may be considered a third stage 353 of operation of thermal system 210.

Fluid 324 moves through reservoir 314 and to valve 332. Valve 332 may be open to line 354, which may carry fluid 324 to valve 328. Valve 32 may also be open to line 356, which carries fluid 324 to drive unit 322 to heat drive unit 322.

With respect to valve 330, when sensor 333 monitoring battery system 206 and sensor 335 monitoring drive unit 322 indicate that the temperatures of these components have reached the desired operating temperature (e.g., about or within selected tolerances of 30 degrees Celsius), valve 330 may open to radiator 303 and close to reservoir 314. Valve 330 being open to radiator 303 and being closed to reservoir 314 may be considered a fourth stage 362 of operation for thermal system 210. In this fourth stage 362, valve 330 prevents fluid 324 from entering line 350 and diverts fluids 324 to line 352 towards radiator 303 for cooling of fluid 324 by radiator 303. Radiator 303 may be used to cool fluid 324 during operation (e.g., driving) of vehicle 200 to ensure that fluid 324 and/or the various components of vehicle 200 do not overheat.

Figure 4:
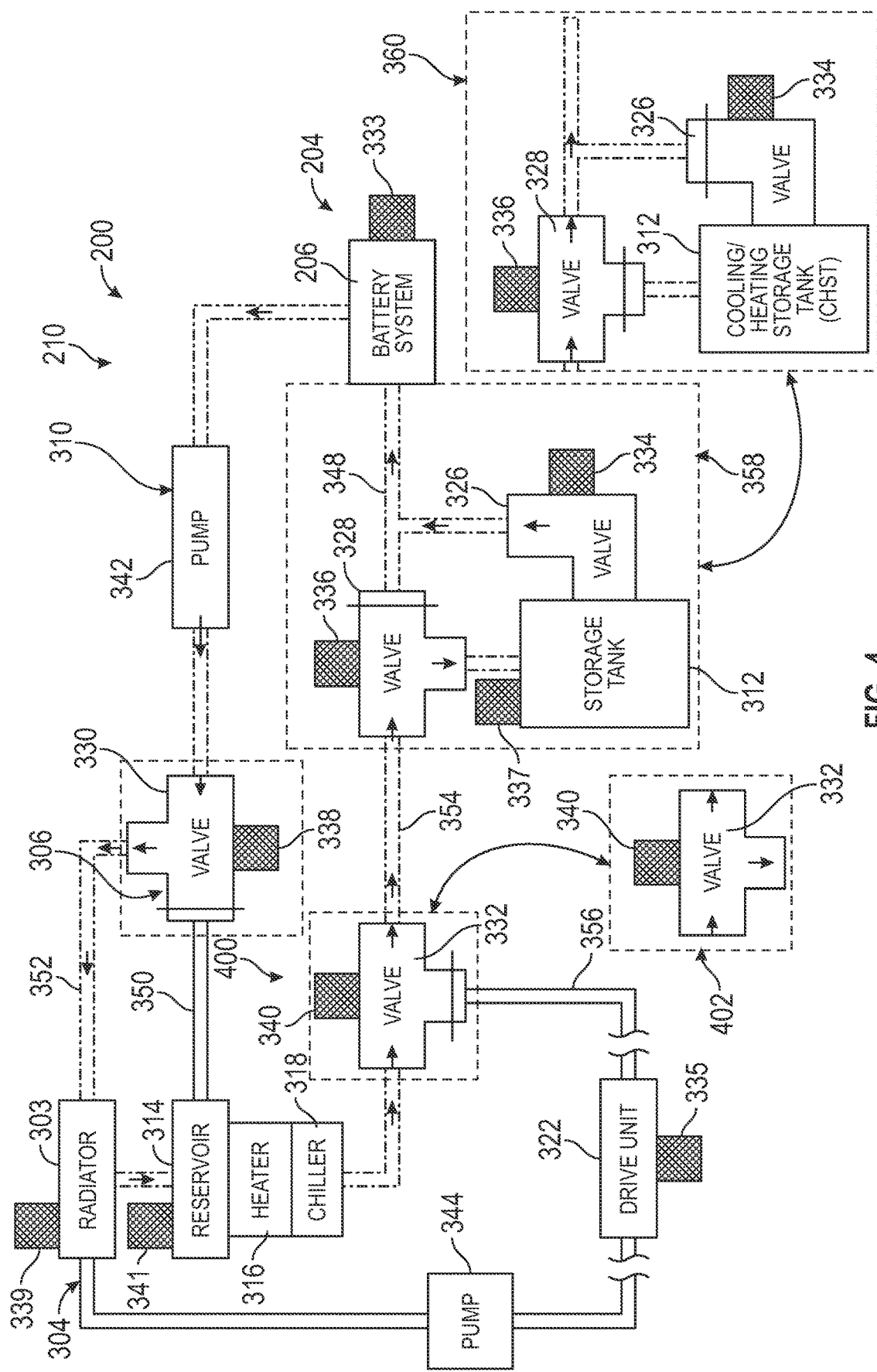
FIG. 4 is a schematic diagram of another operational configuration for the thermal system from FIG. 3 in accordance with one or more embodiments.

FIG. 4 is a schematic diagram of another operational configuration for thermal system 210 in accordance with one or more embodiments. In this operational configuration for thermal system 210, thermal system 210 may be used to provide cooling.

In one or more embodiments, fluid 324 that is cold may be sent to storage tank 312 for storage, which may cause fluid 324 that is older (e.g., hot fluid or fluid that is not "cold") to be moved out of storage tank 312. In some embodiments, chiller 318 is used to cool fluid 324 during driving or when an air condition system of vehicle 200 is being used to ensure a sufficiently low temperature for fluid 324 that enters storage tank 312. For example, fluid 324 that is sufficiently cold for cooling may be considered a temperature that is below the desired operating temperature of battery system 206 and/or drive unit 322. For example, this temperature may be 29 degrees Celsius, 28 degrees Celsius, 25 degrees Celsius, 20 degrees Celsius, 15 degrees Celsius, or some other temperature.

In some embodiments, during charging of vehicle 200, thermal system 210 circulates fluid 324 in a manner that provides additional cooling. For example, thermal system 210 may open valve 326 to allow cold fluid 324 to move from storage tank 312, through line 348, and to battery system 206. Valve 328 may remain closed to line 348 until, for example, a zero or substantially zero temperature differential is detected between sensor 336 and sensor 334. Upon detecting this zero or substantially zero temperature differentia, valve 328 closes to storage tank 312 and opens to line 348 to enable the flow of fluid 324 towards battery system 206. A zero or substantially zero temperature differential between sensor 336 and sensor 334 in this situation may mean that there is no more cold fluid 324 in storage tank 312 that would enable cooling of battery system 206. While such cooling is desired, valve 330 may be closed to line 350 and open to radiator 303 to help facilitate the cooling of fluid 324 while cooling is desired.

In one or more embodiments, during charging, drive unit 322 is not being used by vehicle 200. Thus, drive unit 322 may not need to be cooled. Accordingly, valve 332 may be closed to line 356 and open to line 354 because drive unit 322 may not need to be cooled during charging. Valve 332 being open to line 354 and being closed to line 356, and thereby drive unit 322, may be considered a fifth stage 400 of operation for thermal system 210.

In one or more embodiments, drive unit 322 may heat during driving, and cooling may be desired. Operation during driving may be similar to the operation during charging except for operation of valve 332. During driving, valve 332 may be opened to both line 356 and line 354 to ensure cooling of drive unit 322. Valve 332 being open to both line 356 and line 354 may be a sixth stage 420 of operation for thermal system 210.

Figure 5:
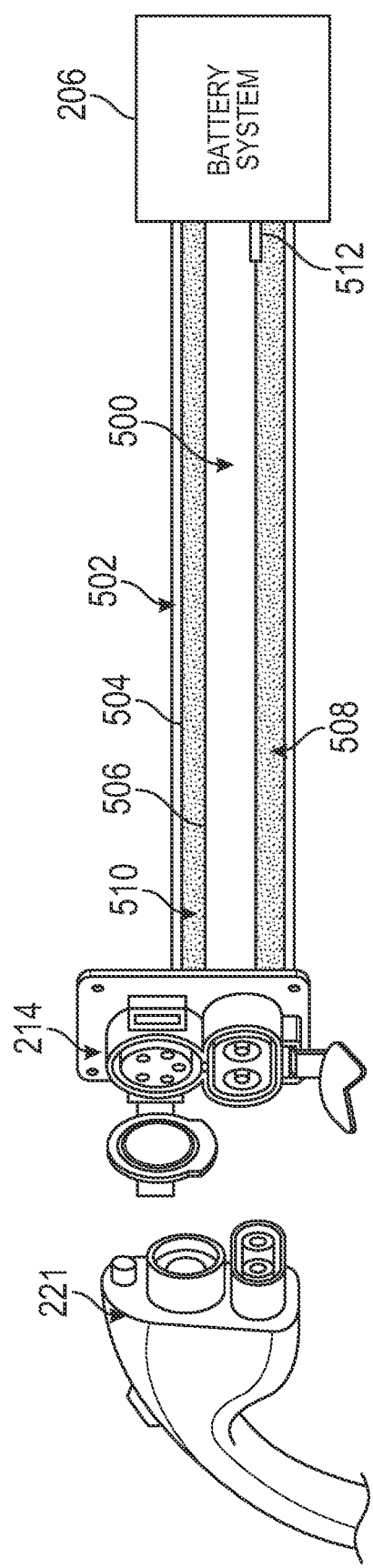
FIG. 5 is a schematic diagram of a cross-sectional view of a charging component of the charging system from Figure in accordance with one or more embodiments.

FIG. 5 is a schematic diagram of a cross-sectional view of a charging component of charging system 208 from FIG. 2 in accordance with one or more embodiments. Charging system 208 includes charge connector 214 and charging component 500. In one or more embodiments, charging component 500 takes the form of a cable that connects charge connector 214 to battery system 205. Charging component 500 may, for example, directly connect charge connector 214 to battery system 205. In other embodiments, charging component 500 may be another type of component.

Regulation jacket 502 is one example of a device in set of devices 222 in FIG. 2. Regulation jacket 502 surrounds charging component 500. In one or more embodiments, regulation jacket 502 takes the form of a hollow cable or sleeve that is fit over charging component 500. Regulation jacket 502 is sized such that inner surface 504 of regulation jacket 502 does not contact outer surface 506 of charging component 500 at least a long a portion of the length of charging component 500. In this manner, regulation jacket 502 has channel 508 that is formed between inner surface 504 of regulation jacket 502 and outer surface 506 of charging component 500. Channel 508 allows fluid 510 to flow within regulation jacket 502 and surround charging component 500.

Fluid 510 is used to regulate the temperature of charging component 500. In one or more embodiments, fluid 510 takes the form of a coolant. For example, fluid 510 may include water, ethylene glycol, propylene glycol, a perfluoropolyether (PFPE) (e.g., Galden®), a fluorocarbon-based fluid (e.g., Fluorinert®), another type of coolant, a thermal fluid, or a combination thereof. In one or more embodiments, fluid 510 remains present within channel 508 to regulate the temperature of charging component 500. In one or more embodiments, fluid 510 is the same fluid 324 that is used in FIG. 3 and circulated via thermal system 210.

In some embodiments, set of devices 222 in FIG. 2 includes one or more other regulation jackets, similar to regulation jacket 502, that are used to provide temperature regulation for one or more other components of charging system 208 in FIG. 2. For example, one or more other regulation jackets may be used to regulate the temperature of other cables within vehicle power system 204 in FIG. 2.

In one or more embodiments, temperature sensor 512 is attached to charging component 500. Temperature sensor 512 monitors a temperature of charging component 500. A controller, such as controller 212 in FIG. 2, may initiate the flow of fluid 510 into channel 508 in response to a temperature of charging component 500 rising above a selected threshold. This threshold may be, for example, without limitation, about 90 degrees Fahrenheit or another temperature above 85 degrees Fahrenheit. In some embodiments, temperature sensor 512 takes the form of a thermocouple.

Figure 6:
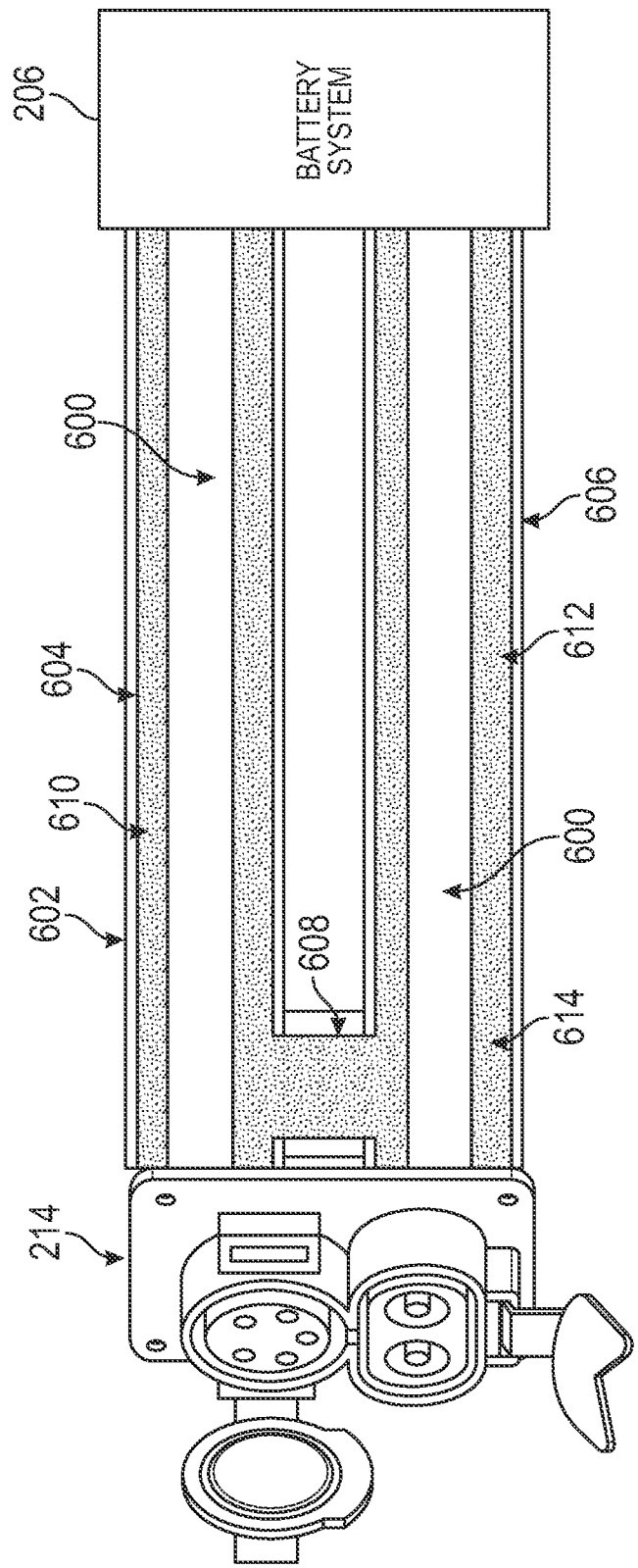
FIG. 6 is schematic diagram of another configuration for components of the charging system from FIG. 2 in accordance with one or more embodiments.

FIG. 6 is a schematic diagram of another configuration for components of charging system 208 from FIG. 2 in accordance with one or more embodiments. In FIG. 6, charging system 208 includes charge connector 214, charging component 500, and charging component 600.

Regulation jacket 602 is one example of a device in set of devices 222 in FIG. 2. Regulation jacket 602 surrounds both charging component 500 and charging component 600 in a manner similar to regulation jacket 502 in FIG. 5. Regulation jacket 602 includes first portion 604, second portion 606, and connecting portion 608. First portion 604 and second portion 606 surround charging component 500 and charging component 600, respectively. Charging component 500 and charging component 600 may both be cables in various embodiments. First portion 604 and second portion 606 have channel 610 and channel 612, respectively, that allow fluid 614 to flow around and cool charging component 500 and charging component 600, respectively.

Connecting portion 608 connects first portion 604 and second portion 606 to fluidly connect channel 610 and channel 612. In this manner, fluid 614 can have a flow through regulation jacket 602. For example, fluid 614 may enter regulation jacket 602 from one or more of lines 304 via first portion 604, flow through first portion 604 and into second portion 606, and then exit second portion 606 back to one or more of lines 304 in FIG. 3. In other examples, fluid 614 enters regulation jacket 602 via second portion 606, flows through second portion 606 to first portion 604, and exits first portion 604.

Figure 7:
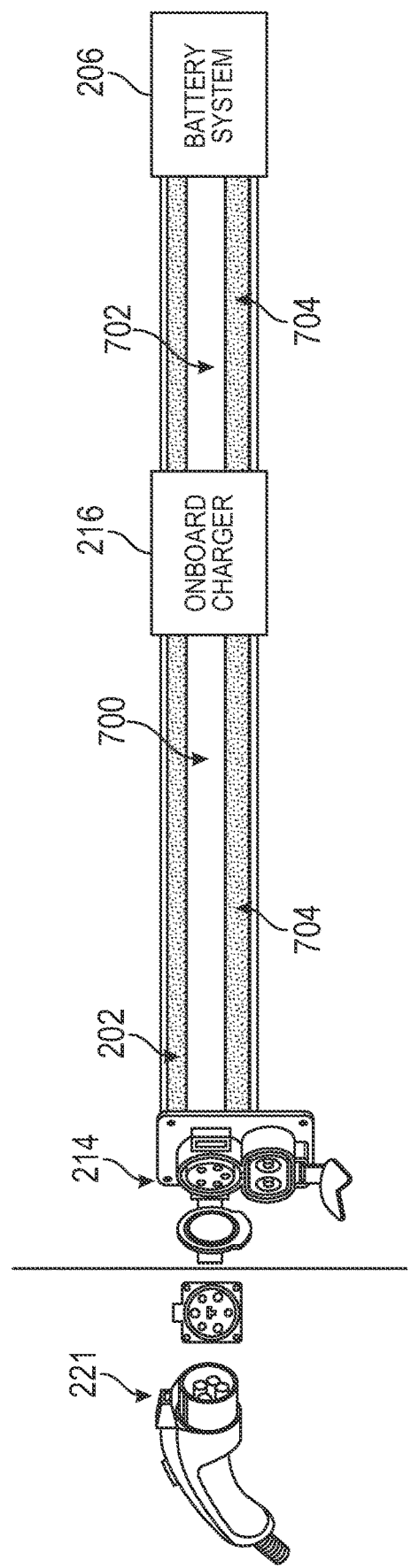
FIG. 7 is a schematic diagram of a cross-sectional view of another configuration of charging components within the charging system from FIG. 2 in accordance with one or more embodiments.

FIG. 7 is a schematic diagram of a cross-sectional view of another configuration of charging components within charging system 208 from FIG. 2 in accordance with one or more embodiments. In FIG. 7, charging system 208 includes charge connector 214, charging component 700, charging component 702, and onboard charger 216. Charging component 700 connects charge connector 214 to onboard charger 216. Charging component 702 connects onboard charger 216 to battery system 206. Charging component 700 and charging component 702 are surrounded by regulation jacket 704 and regulation jacket 706, respectively. Regulation jacket 704 and regulation jacket 706 are each implemented in a manner similar to regulation jacket 502 in FIG. 5.

The schematic diagrams of vehicle 200 and thermal system 210 in FIGS. 2-4 and the schematic diagrams in FIGS. 5-8 are not intended to imply physical or architectural limitations to the manner in which one or more example embodiments may be implemented. Other components in addition to or in place of the ones illustrated may be used. Some components may be optional. The different components shown in FIGS. 2-7 are examples of how some components shown in block form in FIG. 1 can be implemented as physical structures. Additionally, some of the components in FIGS. 2-7 may be combined with components in FIG. 1 and/or other components in FIGS. 2-7, used with components in FIG. 1 and/or other components in FIGS. 2-7, or a combination thereof.

For example, in some embodiments, the various "lines" described in FIGS. 3-4 may be implemented in different ways. A line may be a single fluid line or multiple fluid lines connected in one or more different ways. In some embodiments, the charging components shown in FIGS. 5-7 may be connected to one or more of the components in FIGS. 3-4. As one example, charging component 500 and/or regulation jacket 502 in FIG. 5 may connect to a line coming from battery system 206 or battery system 206. In some embodiments, fluid 510 flowing through regulation jacket 502 may be the same as fluid 324 flowing through thermal system 210 in FIGS. 3-4.

FIG. 8 is a flowchart of a method 800 for temperature regulation of a charging system in accordance with one or more embodiments. Method 800 is illustrated as a set of operations or steps and is described with continuing reference to FIGS. 1-2. One or more operations or steps that are not expressly illustrated in FIG. 8 may be included before, after, in between, or as part of the operations or steps of method 800. In some embodiments, one or more of the operations or steps may be implemented, at least in part, in the form of executable code stored on non-transitory, tangible, machine-readable media that when run by one or more processors may cause the one or more processors to perform one or more of the processes. Method 800 may be implemented using thermal system 108 described in FIG. 1, thermal system 210 described in FIG. 2, and/or one or more of the regulation jackets described in FIGS. 5-7.

Method 800 may begin by providing a fluid within a channel formed between a charging component of the charging system in a vehicle and a regulation jacket that surrounds the charging component (operation 802). The regulation jacket may be implemented in a manner similar to, for example, without limitation, regulation jacket 502 in FIG. 5, regulation jacket 602 in FIG. 6, and/or regulation jacket 702 or regulation jacket 704 in FIG. 7.

The charging component of the charging system is cooled via the fluid (operation 804). The fluid may be, for example, a coolant that provides cooling such that charging component does not overheat.

FIG. 9 is a flowchart of a method 900 for temperature regulation within a vehicle in accordance with one or more embodiments. Method 900 is illustrated as a set of operations or steps and is described with continuing reference to FIG. 1. One or more operations or steps that are not expressly illustrated in FIG. 9 may be included before, after, in between, or as part of the operations or steps of method 900. In some embodiments, one or more of the operations or steps may be implemented, at least in part, in the form of executable code stored on non-transitory, tangible, machine-readable media that when run by one or more processors may cause the one or more processors to perform one or more of the processes. Method 900 may be implemented using thermal system 110 described in FIG. 1 and thermal system 210 described in FIGS. 2-4.

Method 900 begins by receiving an indication that the battery system will need to be heated upon a next startup of the vehicle (operation 902). In operation 902, the indication may be, for example, weather information indicating that temperatures will be cold (e.g., near freezing, below freezing, etc.) at the next startup of the vehicle.

A fluid that has been heated during operation of the vehicle is stored in a storage tank (operation 904). For example, the fluid may be heated during driving of the vehicle. The fluid may be stored in the storage tank before and/or after the vehicle has been turned off (e.g., the motor has been shut down).

At the next startup of the vehicle, a flow of the fluid is controlled from the storage tank to the battery system to heat the battery system (operation 906). Operation 906 may be performed by, for example, opening up a valve associated with the storage tank to enable the flow of the fluid from the storage tank to the battery system via one or more lines connecting the storage tank to the battery system.

Figure 10:
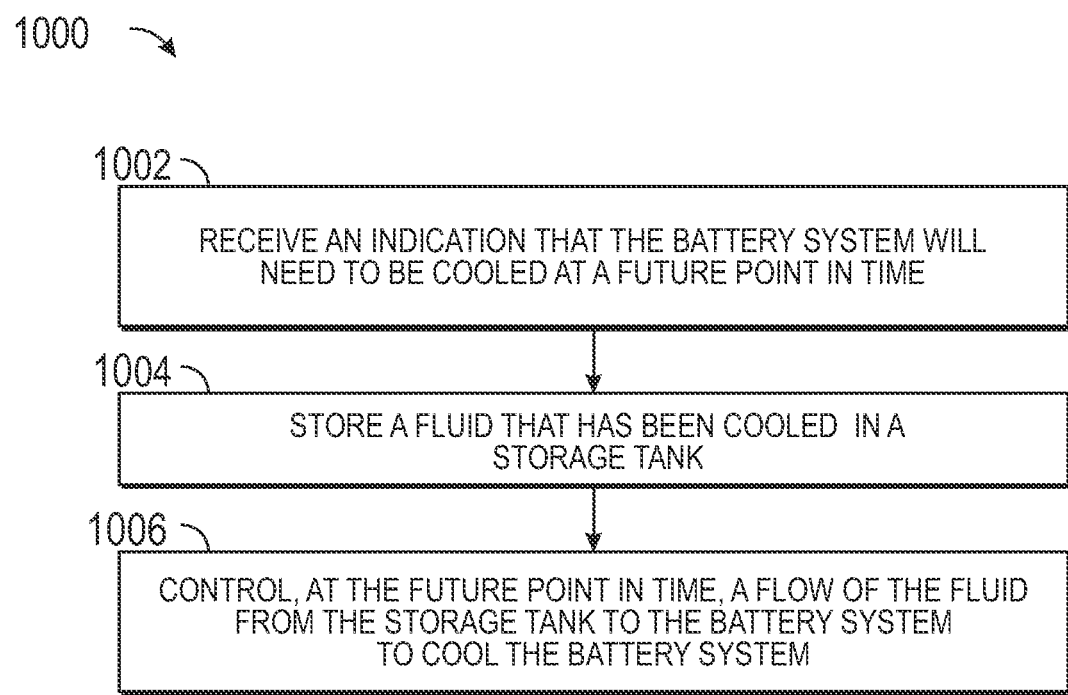
FIG. 10 is a flowchart of a method for temperature regulation within a vehicle in accordance with one or more embodiments.

FIG. 10 is a flowchart of a method 1000 for temperature regulation within a vehicle in accordance with one or more embodiments. Method 1000 is illustrated as a set of operations or steps and is described with continuing reference to FIG. 1. One or more operations or steps that are not expressly illustrated in FIG. 10 may be included before, after, in between, or as part of the operations or steps of method 1000. In some embodiments, one or more of the operations or steps may be implemented, at least in part, in the form of executable code stored on non-transitory, tangible, machine-readable media that when run by one or more processors may cause the one or more processors to perform one or more of the processes. Method 1000 may be implemented using thermal system 110 described in FIG. 1 and thermal system 210 described in FIGS. 2-4.

Method 1000 includes receiving an indication that the battery system will need to be cooled at a future point in time (operation 1002). The indication may be, for example, that the vehicle will be operating in a manner that places significant demand on the battery system, thereby causing heating.

A fluid that has been cooled during operation of the vehicle is stored in a storage tank (operation 1004). For example, the fluid may be cooled when the vehicle has been started up in cold weather. In some examples, the fluid is cooled by a chiller in the vehicle power system. In some embodiments, the fluid is cooled by a radiator in the vehicle power system. The fluid may be stored in the storage tank before and/or after the vehicle has been turned off (e.g., the motor has been shut down).

At the future point in time, a flow of the fluid from the storage tank to the battery system is controlled to cool the battery system (operation 1006). Operation 1006 may be performed by, for example, opening up a valve associated with the storage tank to enable the flow of the fluid from the storage tank to the battery system via one or more lines connecting the storage tank to the battery system.

The flowcharts and block diagrams in the different depicted embodiments illustrate the architecture, functionality, and operation of some possible implementations of apparatuses and methods in an embodiment. In this regard, each block in the flowcharts or block diagrams may represent a module, a segment, a function, and/or a portion of an operation or step. In some alternative implementations of an embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 11:
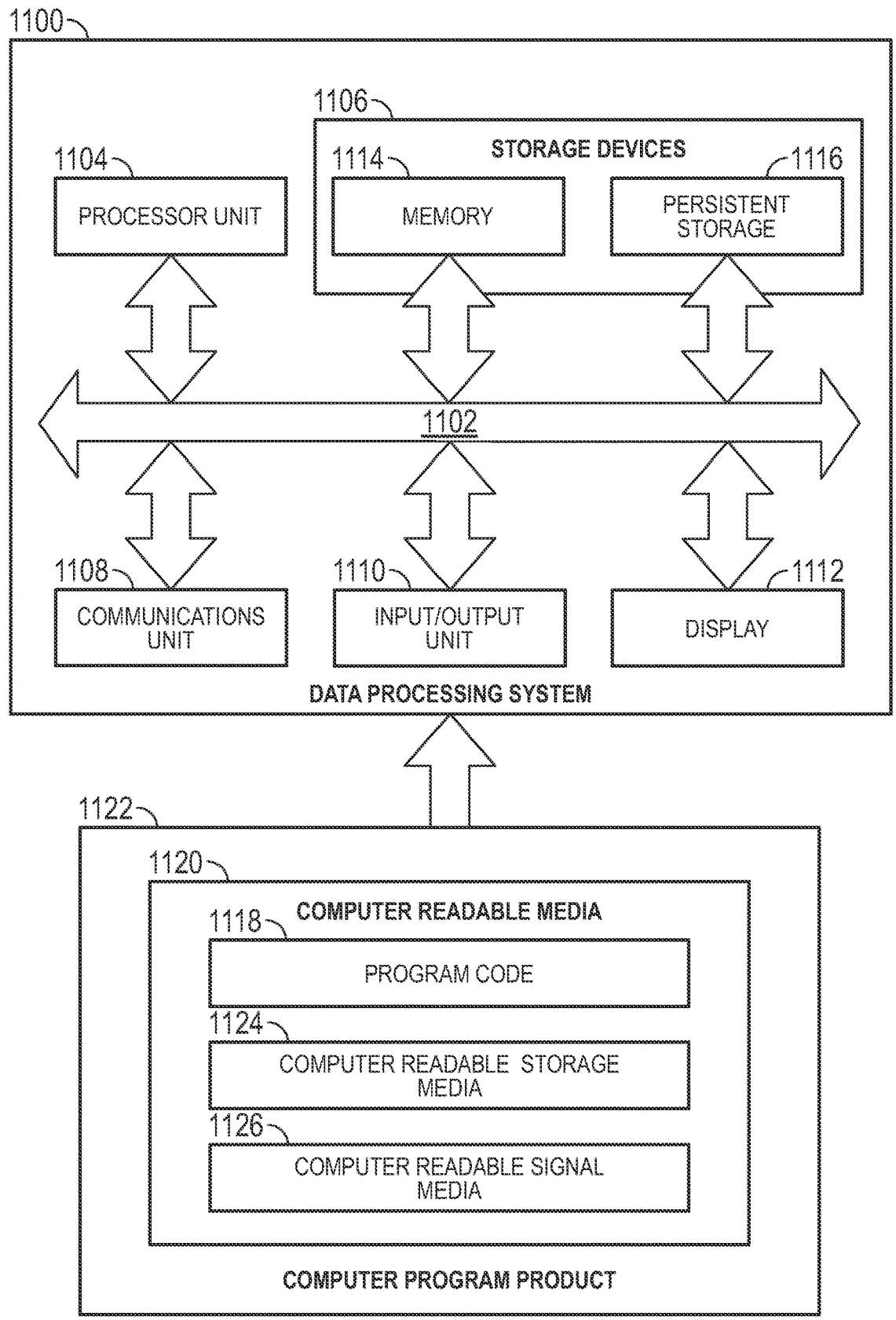
FIG. 11 is a block diagram of a data processing system in accordance with one or more embodiments.

FIG. 11 is a block diagram of a data processing system in accordance with one or more embodiments. Data processing system 1100 is an example one manner in which controller 112 in FIG. 1 and/or controller 212 may be implemented. As depicted, data processing system 1100 includes communications framework 1102, which provides communications between processor unit 1104, storage devices 1106, communications unit 1108, input/output unit 1110, and display 1112. In some cases, communications framework 1102 may be implemented as a bus system.

Processor unit 1104 is configured to execute instructions for software to perform a number of operations. Processor unit 1104 may comprise a number of processors, a multi-processor core, and/or some other type of processor, depending on the implementation. In some cases, processor unit 1104 may take the form of a hardware unit, such as a circuit system, an application specific integrated circuit (ASIC), a programmable logic device, or some other suitable type of hardware unit.

Instructions for the operating system, applications, and/or programs run by processor unit 1104 may be located in storage devices 1106. Storage devices 1106 may be in communication with processor unit 1104 through communications framework 1102. As used herein, a storage device, also referred to as a computer readable storage device, is any piece of hardware capable of storing information on a temporary and/or permanent basis. This information may include, but is not limited to, data, program code, and/or other information.

Memory 1114 and persistent storage 1116 are examples of storage devices 1106. Memory 1114 may take the form of, for example, a random access memory or some type of volatile or non-volatile storage device. Persistent storage 1116 may comprise any number of components or devices. For example, persistent storage 1116 may comprise a hard drive, a solid state drive, a flash memory, a rewritable optical disk, a rewritable magnetic tape, or some combination of the above. The media used by persistent storage 1116 may or may not be removable.

Communications unit 1108 allows data processing system 1100 to communicate with other data processing systems and/or devices. Communications unit 1108 may provide communications using physical and/or wireless communications links.

Input/output unit 1110 allows input to be received from and output to be sent to other devices connected to data processing system 1100. For example, input/output unit 1110 may allow user input to be received through a keyboard, a mouse, and/or some other type of input device. As another example, input/output unit 1110 may allow output to be sent to a printer connected to data processing system 1100.

Display 1112 is configured to display information to a user. Display 1112 may comprise, for example, without limitation, a monitor, a touch screen, a laser display, a holographic display, a virtual display device, and/or some other type of display device.

In this illustrative example, the processes of the different illustrative embodiments may be performed by processor unit 1104 using computer-implemented instructions. These instructions may be referred to as program code, computer usable program code, or computer readable program code and may be read and executed by one or more processors in processor unit 1104.

In these examples, program code 1118 is located in a functional form on computer readable media 1120, which is selectively removable, and may be loaded onto or transferred to data processing system 1100 for execution by processor unit 1104. Program code 1118 and computer readable media 1120 together form computer program product 1122. In this illustrative example, computer readable media 1120 may be non-transitory (e.g., computer readable storage media 1124) or transitory (e.g., computer readable signal media 1126).

Computer readable storage media 1124 is a physical or tangible storage device used to store program code 1118 rather than a medium that propagates or transmits program code 1118. Computer readable storage media 1124 may be, for example, without limitation, an optical or magnetic disk or a persistent storage device that is connected to data processing system 1100.

Alternatively, program code 1118 may be transferred to data processing system 1100 using computer readable signal media 1126. Computer readable signal media 1126 may be, for example, a propagated data signal containing program code 1118. This data signal may be an electromagnetic signal, an optical signal, and/or some other type of signal that can be transmitted over physical and/or wireless communications links.

The illustration of data processing system 1100 in FIG. 11 is not meant to provide architectural limitations to the manner in which the illustrative embodiments may be implemented. The different illustrative embodiments may be implemented in a data processing system that includes components in addition to or in place of those illustrated for data processing system 1100. Further, components shown in FIG. 11 may be varied from the illustrative examples shown.

The present embodiments can take the form of an entirely hardware embodiment, an entirely software embodiment, or an embodiment containing both hardware and software elements. Accordingly, it is understood that any operation of the computing systems may be implemented by a computing system using corresponding instructions stored on or in a non-transitory computer readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

What is claimed is:

1. An apparatus comprising:
   a charging component within a charging system of a vehicle, the charging component is coupled on a first end to a battery system of the vehicle; and
   a regulation jacket surrounding the charging component and forming a channel between an inner surface of the regulation jacket and an outer surface of the charging component, the regulation jacket being configured to receive a fluid within the channel to cool the charging component.

2. The apparatus of claim 1, further comprising:
   a temperature sensor configured to monitor a temperature of the charging component; and
   a controller configured to initiate a flow of the fluid into the channel in response to the temperature of the charging component rising above a selected threshold.

3. The apparatus of claim 2, wherein the temperature sensor includes a thermocouple.

4. The apparatus of claim 1,
the charging system of the vehicle, wherein the charging system comprises a charge connector, wherein the charging component is coupled on a second end to the charge connector.

5. The apparatus of claim 4, wherein the charging component comprises:
a first cable that connects the charge connector to an on-board charger.

6. The apparatus of claim 5, wherein the charging component further comprises:
a second cable that connects the on-board charger to the battery system.

7. The apparatus of claim 6, wherein the battery system includes a high-volt battery pack.

8. The apparatus of claim 4, wherein the charging component includes a cable that connects the charge connector to the battery system.

9. The apparatus of claim 8, wherein the battery system includes a high-volt battery pack.

10. The apparatus of claim 1, wherein the fluid is a coolant.

11. An electric vehicle comprising:
a battery system;
a charging system coupled to the battery system, the charging system comprising a charging component, wherein the charging component comprises a length; and
a regulation jacket entirely surrounds the charging component along the length and forming a channel between an inner surface of the regulation jacket and an outer surface of the charging component, the regulation jacket being configured to receive a fluid within the channel to regulate a temperature of the charging component.

12. The electric vehicle of claim 11, further comprising:
a temperature sensor configured to monitor the temperature of the charging component; and
a controller configured to initiate a flow of the fluid into the channel around the charging component in response to the temperature of the charging component rising above a selected threshold.

13. The electric vehicle of claim 11, wherein the charging system comprises a plurality of charging components that includes the charging component; and
wherein the regulation jacket is one of a plurality of regulation jackets that surround the plurality of charging components.

14. A method for temperature regulation of a charging system, the method comprising:
storing a fluid in an insulated storage tank;
providing the fluid, from the insulated storage tank, within a channel formed between a charging component of the charging system in a vehicle and a regulation jacket that surrounds the charging component; and
cooling, via the fluid, the charging component of the charging system.

15. The method of claim 14, further comprising:
monitoring a temperature of the charging component; and
detecting when the temperature of the charging component rises above a selected threshold.

16. The method of claim 15, wherein providing the fluid comprises:
initiating a flow of the fluid into the channel around the charging component in response to a detection of the temperature of the charging component rising above the selected threshold.

17. The method of claim 14, wherein cooling, via the fluid, the charging component comprises:
cooling, via the fluid, a charge connector of the charging system using ethylene glycol.

18. The method of claim 14, wherein cooling, via the fluid, the charging component comprises:
cooling, via the fluid, a cable that connects a charge connector of the charging system to a battery system of the vehicle.

19. The method of claim 14, wherein cooling, via the fluid, the charging component comprises:
cooling, via the fluid, a cable that connects a charge connector of the charging system to an on-board charger of the vehicle.

20. The method of claim 14, wherein cooling, via the fluid, the charging component comprises:
cooling, via the fluid, a cable that connects an on-board charger of the charging system to a battery system of the vehicle.

* * * * *